March 15, 1932. L. LEWIS 1,849,629
MASSAGING DEVICE
Filed April 9, 1929
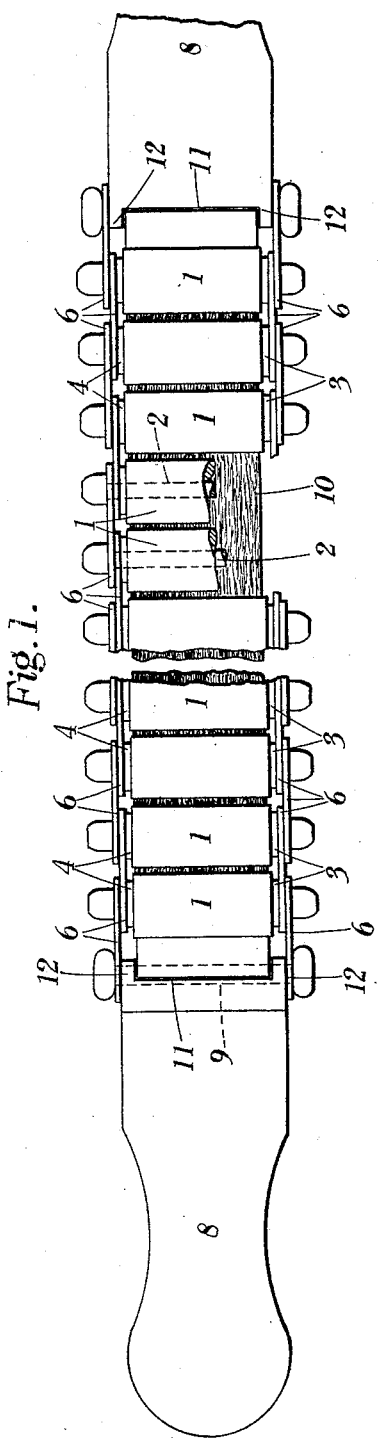
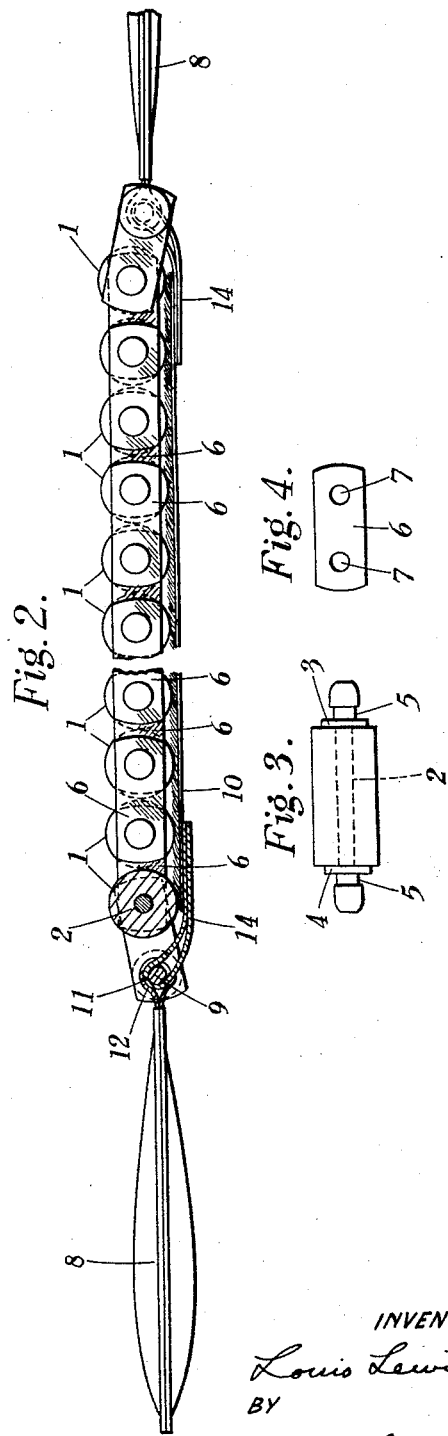
INVENTOR
Louis Lewis
BY
Nathan Bowman
ATTORNEYS Patented Mar. 15, 1932

1,849,629

UNITED STATES PATENT OFFICE

LOUIS LEWIS, OF LONDON, ENGLAND

MASSAGING DEVICE

Application filed April 9, 1929. Serial No. 353,748.

The present invention relates to improvements in massaging devices, and deals with a novel massaging device in which a series of juxtaposed single or multiple rollers or cylindrical or spherical shaped bodies or the like are mounted to rotate on separate axes in a chain or an elastic chain or equivalent whereby to permit the line of bodies to flex to conform to the figure of the body and where desired to permit such bodies to recede and approach as the elastic chain or the like is stretched or relaxed in the act of frictioning the device to and fro over the body.

A strip may be provided for carrying medicated or other material to be transferred to the body by the rubbing or kissing contact of the rollers or the like with such strip.

The aforesaid strip may be detachable for interchanging or for use only when desired.

The present invention, which broadly consists in a row of single or multiple rollers or other bodies strung out on separate spindles by a chain or like mounting, comprising a succession of elastic links capable of being sprung into recesses at the ends of the spindles, can be carried out in divers ways, but in order to make the invention the more readily understood, it will be hereinafter described with reference to the particular constructional form thereof as illustrated in the accompanying drawings, in which:—

Fig. 1 is a plan view.
Fig. 2 a side view.
Fig. 3 a side view of one of the rollers.
Fig. 4 a face view of an elastic link.

Referring to the drawings, rollers 1 of any appropriate material, are each mounted on a spindle 2 which is provided with retaining flanges 3, 4 and annular recesses 5 on the opposite ends thereof.

The rollers 1 are linked together at both ends by a succession of elastic links 6, which may conveniently and advantageously be made of vulcanized rubber with end holes 7 of a size adapted to permit the ends of the links 6 to be sprung over the ends of the spindles 2, and then to grip the bottoms of the recesses 5.

To the links of the outermost rollers 1 are attached handles 8, such as by a double headed or screw-nutted spindle or pin 9, around which the handles may have looped connexions.

10 indicates a rubbing strip or medicament or like carrier, which may be connected to the spindle 9 by an elastic loop 14 through slots 11 in the handle loops 12 and detachably fastened to the main portion of the strip.

A massage device as above described is quickly adjustable for length to suit different persons by adding or removing one or more rollers 1.

Further its action on the skin by the recession and approach of the rollers as the elastic chain assemblage is stretched and relaxed in the act of applying it to the body, stretches and relaxes the skin in a comparable manner to the well known process of finger massage.

This action may further be promoted by providing the rollers or other shaped bodies with appropriate irregular or non-smooth surfaces. The rollers may have bristles or flexible slender components secured thereon.

Moreover in use the device further acts as an exerciser for muscle development and fat reduction.

A device substantially as herein described may be adapted to be operated by hand or power.

What I claim is:—

1. Massage device comprising a series of rotatable bodies, a corresponding series of spindles on which said bodies are mounted free to rotate, and a succession of elastic links linking said spindles together, said spindles and said links being so formed respectively as to permit the ends of the links to be sprung over the spindles to grip the bottoms of recesses therein.

2. Massage device comprising a series of rotatable bodies, a corresponding series of spindles on which said bodies are mounted free to rotate, a succession of elastic links linking said spindles together, said spindles and said links being so formed respectively as to permit the ends of the links to be sprung into recesses at the ends of the spindles, and a treated strip extending longitudinally behind the rotatable bodies so that said bodies rub aganst the strip as they rotate for the purpose of collecting material therefrom and transferring it to the body being treated.

In testimony whereof, I affix my signature.

LOUIS LEWIS.